2 Sheets—Sheet 1.
H. I. HEATON,
Assignor to W. A. KNOWLTON.
Cultivator.
No. 7,944. Reissued Nov. 13, 1877.
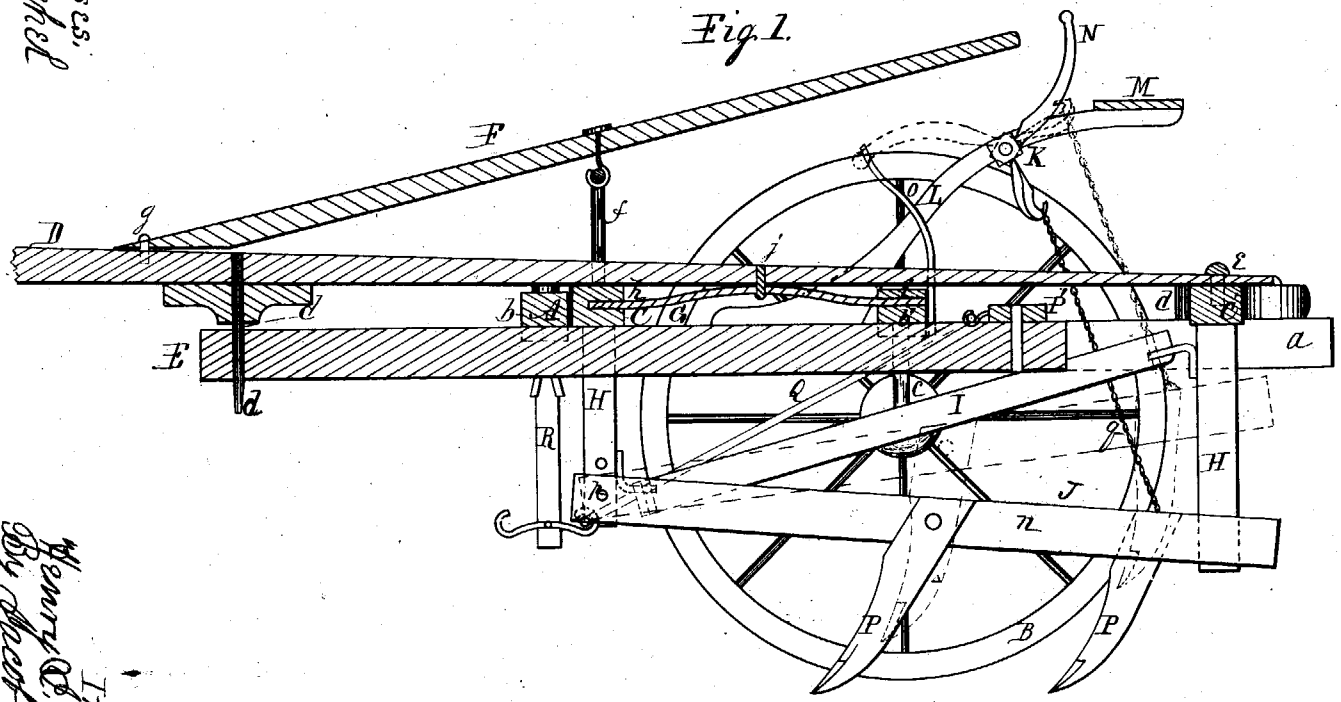
Witnesses.
A. O. Behel
F. J. Sovereign
Inventor.
Henry I. Heaton
By Jacob Behel
Atty.
N. PETERS, PHOTO-LITHOGRAPHER, WASHINGTON, D. C.

2 Sheets—Sheet 2.
H. I. HEATON,
Assignor to W. A. KNOWLTON.
Cultivator.
No. 7,944. Reissued Nov. 13, 1877.
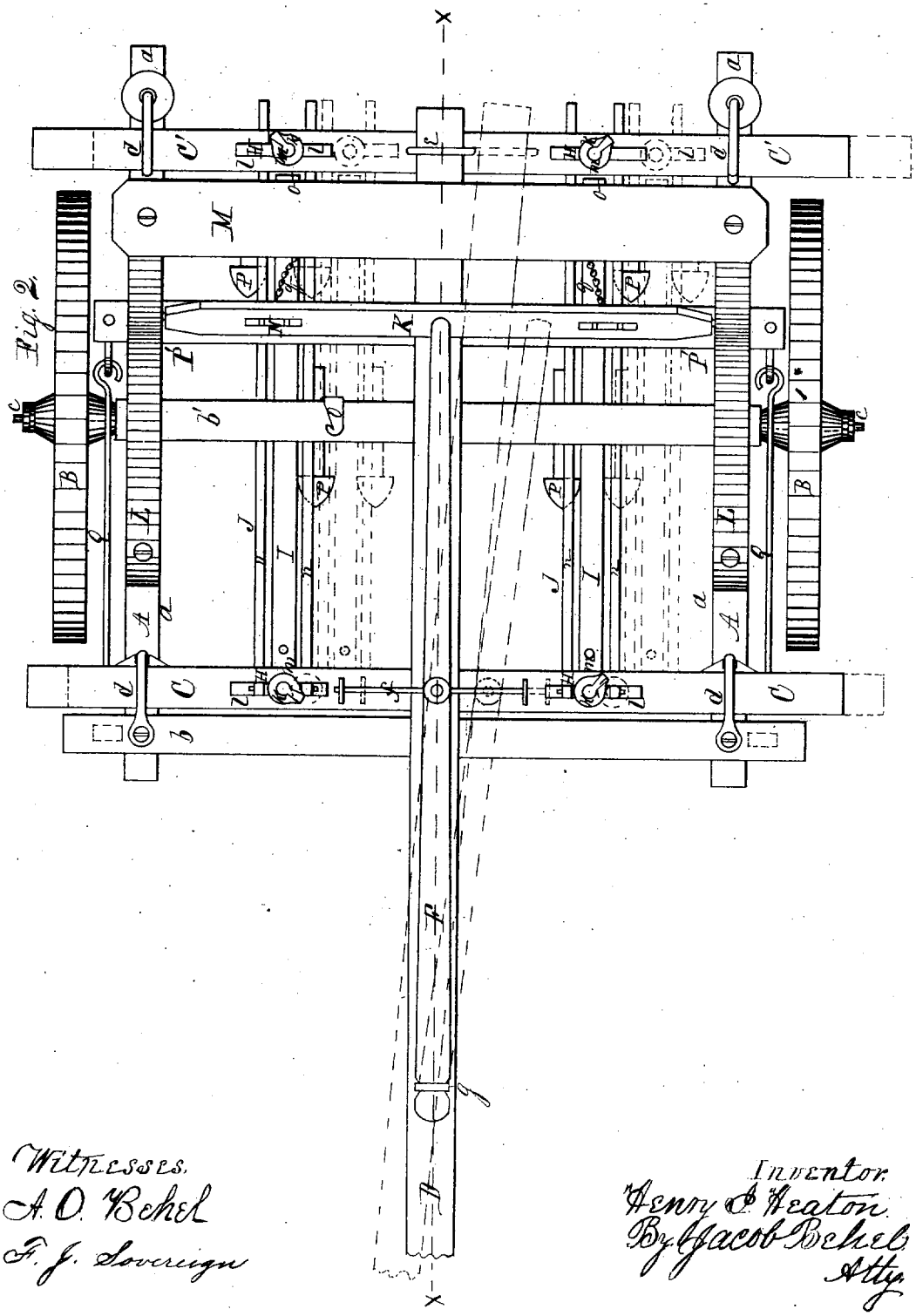
Witnesses.
A. O. Behel
F. J. Sovereign
Inventor.
Henry I. Heaton
By Jacob Behel
Atty
N. PETERS, PHOTO-LITHOGRAPHER, WASHINGTON, D. C.

UNITED STATES PATENT OFFICE.

HENRY I. HEATON, OF SIDNEY, IOWA, ASSIGNOR TO WILLIAM A. KNOWLTON.

IMPROVEMENT IN CULTIVATORS.

Specification forming part of Letters Patent No. 37,166, dated December 16, 1862; Reissue No. 7,944, dated November 13, 1877; application filed June 25, 1877.

*To all whom it may concern:*

Be it known that I, HENRY I. HEATON, of Sidney, in the county of Fremont and State of Iowa, have invented a new and Improved Cultivator; and I do hereby declare that the following is a full, clear, and exact description of the same, reference being had to the accompanying drawings, making a part of this specification, in which—

Figure 1 is a side sectional view of my invention, taken on the line *x x*, Fig. 2. Fig. 2 is a plan or top view of the same.

Similar letters of reference indicate corresponding parts in the two figures.

This invention relates to an improved cultivator of that class in which adjustable or laterally-sliding shares or teeth are employed.

To enable those skilled in the art to fully understand and construct my invention, I will proceed to describe it.

A represents the frame of the machine, which is mounted on two wheels, B B. The frame is of rectangular form, and is composed of two longitudinal bars, *a a*, connected by two or more transverse bars, *b b′*, the latter having the arms *c c*, on which the wheels B work, attached to it.

On the frame A there are placed transversely two bars, C C′, which are allowed to slide freely on the frame in a transverse direction therewith, said bars being fitted in suitable guides *d* on the frame A.

D represents the draft-pole of the machine, which is attached by a pivot-bolt, *d*, to the front part of a bar, E, said bar projecting centrally from the front part of the frame A. The draft-pole D extends to the back part of the frame A, and is connected at *e* to the sliding bar C′, which is on the back part of the frame A. The sliding bar C, which is on the front part of said frame, has an upright bail-shaped support, *f*, attached to it, to which a lever, F, is attached, the front end of said lever being secured by a staple, *g*, to the draft-pole D, which staple forms a fulcrum for said lever. The front sliding bar C is also connected by an arm, G, to the draft-pole D, the front end of said arm being attached by a pivot, *h*, to the center of bar C, and its back end connected by a pivot, *i*, to the transverse bar *b′*, the arm G being connected to the draft-pole D by a pivot, *j*, at a point about midway between the bar C and the transverse bar *b′*. (See Fig. 1.)

From the above description it will be seen that by moving the lever F either to the right or left, the bars C C′ will be simultaneously moved in the same direction, and also the back part of the draft-pole D, the front part of the latter being held by the neck-yoke and team. Each sliding bar C C′ has two pendent bars, H, attached to it by screw-bolts *k*, which pass through oblong slots *l* in the bars C C′, and are secured therein at any desired point by the nuts *m* of the bolts. By this mode of attaching the bars H to the bars C C′, the former may be adjusted laterally at a greater or less distance, as desired.

I I represent inclined braces, which are attached at their front ends to the lower parts of the pendent bars H of the front bar C, and attached at their back ends to the upper part of the bars H of the back bar C′. J J represent narrow frames, formed, each, of two parallel bars, *n n*, connected by transverse bars *o*. The front ends of these frames are connected by joints *p* to the lower ends of the pendent bars H of the front sliding bar C. The back parts of these frames J are connected by chains *q* to a shaft, K, the journals of which are in inclined bars L L on the frame A, on the back parts of which the driver's seat M is secured. The shaft K has a lever, N, attached to it, and a hook, O, is attached to hold the lever N, when pressed down. The pendent bars H of the back sliding bar C′ fit in the back parts of the frame J J, and serve as guides for the same, preventing any lateral working or play thereof, independent of the sliding bars C C′.

To the frames J J the shares or teeth P are attached. These shares or teeth may be of the usual or any proper form, and they may be raised entirely free from the ground, when necessary, by turning the shaft K, the chains *q q* elevating them, and the chains held in proper position by placing the lever N under the hook O on the frame A.

In order to adjust the shares or teeth laterally, either to the right or left, the lever F is moved, and consequently the bars C C′ and draft-pole D, the front part of the latter moving in a reverse direction to the shares or teeth, and consequently enabling the machine to be readily adjusted to the sinuosities of the rows or plants. The shares, it will be seen, may be adjusted nearer together or farther apart by adjusting the pendent bars H, as previously described. It is designed to have the shares of the two frames J J work at opposite sides of each row of plants, a horse walking in the spaces between the rows.

The double-tree P′ is pivoted to the frame A, near its back part, and a draft-rod, Q, is attached to each end of the double-tree. These rods extend forward on each side of the frame, and are attached at their forward ends to pendants R, which are connected to the front transverse bar *b* by hinges or pivots, which admit of a forward and backward movement of the pendants to utilize the swinging movement of the double-tree as an evener. The whiffletrees are attached to the pendants R, which admit of the necessary play of the double-tree, and serve to produce a low draft to balance the machine, and also hold the whiffletrees from dropping or coming in contact with the horse's heels.

Having thus described my invention, what I claim as new, and desire to secure by Letters Patent, is—

1. The arrangement of the sliding bars C C′, draft-pole D, bar E, and lever F, in connection with the frames J J, having the plows P attached, all arranged as and for the purpose hereinbefore set forth.

2. The combination, with a double-tree pivoted in rear of the supporting-axle of the cultivator, of pendants located in advance of said axle, and rigid draft-rods directly connecting the outer ends of the double-tree with the lower ends of said pendants, substantially as described.

HENRY I. HEATON.

Witnesses:
HENRY BOWEN,
JAMES M. WILSON.